United States Patent [19]

Allain et al.

[11] 4,201,758

[45] May 6, 1980

[54] BORON REMOVAL FROM ETHYLENE GLYCOL-MAGNESIUM CHLORIDE SOLUTIONS

[75] Inventors: Ronald J. Allain, Richmond, Tex.; David G. Braithwaite, Village of Golf, Fla.; Ansell L. Reid, Sugar Land, Tex.

[73] Assignee: Nalco Chemical Co., Oak Brook, Ill.

[21] Appl. No.: 22,666

[22] Filed: Mar. 22, 1979

[51] Int. Cl.$^2$ ............................................. C01F 5/30
[52] U.S. Cl. ................................... 423/497; 423/498; 260/462 R
[58] Field of Search ............... 423/283, 497, 498; 260/462 R; 203/12, 14, 56, 64

[56] References Cited

U.S. PATENT DOCUMENTS

| | | | |
|---|---|---|---|
| 1,308,576 | 1/1919 | Calvert | 260/462 R |
| 1,308,577 | 1/1919 | Calvert | 423/283 |
| 2,402,959 | 7/1946 | Gustafson | 423/178 |
| 2,680,259 | 9/1954 | Schechter | 260/462 R |
| 2,808,424 | 10/1957 | May | 260/462 R |
| 2,888,440 | 4/1959 | Tyson | 260/462 R |
| 2,969,275 | 1/1961 | Garrett | 423/283 |
| 3,020,308 | 2/1962 | Stange | 260/462 R |
| 3,072,704 | 1/1963 | Carpenter | 260/462 R |
| 3,111,383 | 11/1963 | Garrett | 423/283 |
| 3,230,245 | 1/1966 | Binning | 260/462 R |
| 3,424,563 | 1/1969 | Grinstead | 423/276 |
| 3,493,349 | 2/1970 | Schiappa | 423/280 |
| 3,679,751 | 7/1972 | Golden | 260/462 R |
| 3,855,392 | 12/1974 | Folkestad | 423/497 |
| 3,966,888 | 6/1976 | Braithwaite | 423/498 |
| 3,983,224 | 9/1976 | Allain | 423/498 |
| 4,035,469 | 7/1977 | Richmond | 423/497 |
| 4,058,588 | 11/1977 | Brown | 423/283 |

*Primary Examiner*—Brian E. Hearn
*Attorney, Agent, or Firm*—John G. Premo; Robert A. Miller

[57] ABSTRACT

A method for removing boric acid and salts therefrom from ethylene glycol-magnesium chloride solutions which contain at least 100 ppm of boron which comprises reducing the pH of such solutions below 7 and then adding thereto at least 3 moles of methanol based on the amount of boric acid or salt thereof present in said solution and then subjecting the thus-treated ethylene glycol-magnesium chloride solution to distillation at a temperature sufficient to remove trimethyl borate-methanol therefrom, thereby reducing the level of boron in the starting solution to not more than 35 ppm.

1 Claim, No Drawings

BORON REMOVAL FROM ETHYLENE GLYCOL-MAGNESIUM CHLORIDE SOLUTIONS

INTRODUCTION

Magnesium chloride intended to be used for the electrolytic production of magnesium should, preferably, contain only a minimum of boric acid and salts thereof. It is well known that the presence of even a small amount of boron in the electrolyte is capable of impairing the current efficiency considerably. The natural salt deposits containing magnesium chloride and the commercial magnesium chloride solutions obtained therefrom normally contain boric acid and/or salts thereof in such an amount that most of it must be removed when the magnesium chloride is to be used for the molten salt electrolytic production of magnesium.

U.S. Pat. Nos. 3,966,888 and 3,983,224 teach methods of producing anhydrous magnesium chloride. The U.S. Pat. No. 3,966,888 patent describes this process as follows:

"Anhydrous magnesium chloride may be prepared from magnesium chloride hydrates by the following sequence of processing steps:

1. Dissolving the magnesium chloride hydrate in ethylene glycol to form a magnesium chloride hydrate solution.
2. Heating the thus-formed solution to remove all the water therefrom thereby forming an ethylene glycol anhydrous magnesium chloride solution.
3. Treating the water-free magnesium chloride-ethylene glycol solution with ammonia to form a magnesium chloride ammonia complex which precipitates from the ethylene glycol.
4. Removing the precipitate from the ethylene glycol and washing it with a low boiling solvent for ethylene glycol to remove any ethylene glycol entrained in the precipitate.
5. Heating the magnesium chloride ammonia complex to drive off the ammonia which leaves as a finished product completely anhydrous magnesium chloride."

The present invention is directed to a method of removing boron impurities from the ethylene glycol-magnesium chloride solutions. This method is relatively simple, inexpensive, and is capable of reducing the boron content to less than 50 ppm and, preferably, to about 15 ppm or less.

THE INVENTION

The invention comprises a method for removing boric acid and salts thereof from ethylene glycol-magnesium chloride solutions which contain at least 100 ppm of boron which comprises reducing the pH of such solutions below 7 and then adding thereto at least 3 moles of methanol based on the amount of boric acid or salt thereof present in said solution and then subjecting the thus-treated ethylene glycol-magnesium chloride solution to distillation at a temperature sufficient to remove trimethyl borate-methanol therefrom, thereby reducing the level of boron in the starting solution to not more than 35 ppm.

The Ethylene Glycol-Magnesium Chloride Solution

The amount of water-free magnesium chloride dissolved in the ethylene glycol in the U.S. Pat. No. 3,966,888 process varies between about 5–10% by weight. In accordance with the invention, there is added to this solution, which may contain 100 ppm or more of boron either as boric acid or its salts, methanol to provide at least 3.1 and, preferably, 3.5 or more moles per mole of boron present. Either prior to or after the methanol addition, the pH of this reaction mixture is adjusted with a water-free acidic material such as HCl, $H_2SO_4$ or $H_3PO_4$ to below 7 and, preferably, to about 5. Since it is difficult to measure pH of an anhydrous system, the amount of acid should be such that it represents from 0.1 to 0.5% by weight based on the weight of methanol added.

After the acid has been added and the methanol is present in the system, it is then heated to a temperature sufficient to cause refluxing of the methanol which has been added. Refluxing methanol is then distilled overhead for a period of time required to distill trimethyl borate and excess methanol from the magnesium chloride glycol brine. This distillation is continued until the boron content is 35 ppm or less. The borate ester will form during the heating-distillation step. Generally, the reaction will occur at room temperature within about ½–1 hour.

EXAMPLE

To illustrate the invention, the following is given by way of example:

75 grams of methyl chloride brine which contained 22.5 grams of magnesium chloride was added to 277.5 grams of ethylene glycol. To this was added 0.4 grams of anhydrous HCl. The boron content was determined to be 280 ppm. This reaction mixture was treated in accordance with the U.S. Pat. No. 3,966,888 patent whereby the brine glycol mixture was rendered water-free and produced anhydrous magnesium chloride in ethylene glycol. To this anhydrous ethylene glycol-magnesium chloride solution was added 200 milliliters of anhydrous methanol. It was brought to reflux for a period of time sufficient to remove all the methanol and trimethyl borate. The overhead contained 250 ppm of boron whereas the glycol-magnesium chloride brine remaining in the reaction vessel contained 30 ppm of boron.

Having thus described our invention, it is claimed as follows:

1. A method for removing boric acid and salts thereof from ethylene glycol-magnesium chloride solutions which contain at least 100 ppm of boron which comprises reducing the pH of such solutions below 7 and then adding thereto at least 3 moles of methanol based on the amount of boric acid or salt thereof present in said solution and then subjecting the thus-treated ethylene glycol-magnesium chloride solution to distillation at a temperature sufficient to remove trimethyl borate-methanol therefrom, thereby reducing the level of boron in the starting solution to not more than 35 ppm.

* * * * *